US006971428B2

(12) United States Patent
Eichlseder (10) Patent No.: US 6,971,428 B2
(45) Date of Patent: Dec. 6, 2005

(54) DEVICE FOR VACUUM-PRESSING OF DVD SUBSTRATES

(75) Inventor: Martin Eichlseder, Tettenweis (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 385 days.

(21) Appl. No.: 10/226,095

(22) Filed: Aug. 22, 2002

(65) Prior Publication Data

US 2003/0070765 A1 Apr. 17, 2003

Related U.S. Application Data

(63) Continuation of application No. PCT/EP01/01979, filed on Feb. 21, 2001.

(30) Foreign Application Priority Data

Feb. 22, 2000 (DE) ................................ 100 08 111

(51) Int. Cl.⁷ ............................................. B32B 31/20
(52) U.S. Cl. ...................... 156/382; 156/539; 156/556; 156/580; 156/581; 100/269.01
(58) Field of Search ............................... 156/285–286, 156/295, 381–382, 539, 556, 580–581; 100/305, 100/315, 316, 264, 269.01, 270, 269.02, 100/269.03, 269.04; 369/286; 360/135; 346/137; 428/64.2–65.9; G11B 7/24, 7/26

(56) References Cited

U.S. PATENT DOCUMENTS

| 4,315,723 A | 2/1982 | Antoine et al. |
| 5,146,438 A | 9/1992 | Harper |
| 5,582,677 A | 12/1996 | Miwa et al. |

FOREIGN PATENT DOCUMENTS

| DE | 30 44 717 C2 | 8/1981 |
| DE | 197 15 779 A1 | 10/1998 |
| DE | 299 04 325 U | 7/1999 |
| DE | 198 17 150 A | 10/1999 |
| EP | 0 624 870 A2 | 11/1994 |
| EP | 0 735 530 A1 | 10/1996 |
| JP | 0610137246 AA | 6/1986 |
| JP | 1-204727 A | 8/1989 |
| JP | 0020239442 AA | 9/1990 |
| JP | 0040032045 AA | 2/1992 |
| JP | 08273210 A | 10/1996 |

Primary Examiner—Jessica Rossi
(74) Attorney, Agent, or Firm—Henry M. Feiereisen (57) ABSTRACT

The invention relates to a device for vacuum-pressing of disk-shaped substrates, in particular DVD substrates into a finished DVD, wherein the device has a vacuum chamber with two substrate holders and an intermediate element that can be displaced inside the vacuum chamber; and wherein the intermediate element divides the vacuum chamber into a first low-pressure chamber and a second chamber that can be alternatingly connected to vacuum or to an overpressure, which makes the device particularly suited for use with a hot-melt thermoplastic adhesive.

15 Claims, 5 Drawing Sheets

DEVICE FOR VACUUM-PRESSING OF DVD SUBSTRATES

CROSS-REFERENCES TO RELATED APPLICATIONS

This application is a continuation of prior filed copending PCT International application no. PCT/EP01/01979, filed, Feb. 21, 2001.

This application claims the priority of German Patent Application Serial No. 100 08 111.8, filed Feb. 22, 2000, pursuant to 35 U.S.C. 119 (a)–(d), the subject matter of which is incorporated herein by reference

FIELD OF THE INVENTION

The invention relates to a device for vacuum pressing of disk-shaped substrates, in particular DVD substrates into a finished DVD, and more particularly to a device that uses a hot-melt thermoplastic adhesive.

BACKGROUND OF THE INVENTION

Various conventional machines apply vacuum and pressure to join disk-shaped substrates, such as DVD substrates, by using both hot-melt adhesives and UV-curable varnishes. UV-curable varnish requires a smaller pressure than hot-melt adhesive. Also, with UV-curable varnish, the superpositioned substrates still float on top of each other as long as the UV varnish is not cured by exposing it to UV radiation. Conversely, with a hot-melt adhesive, the position of the substrates is immediately fixed in upon contact and can no longer be adjusted.

DE 197 15 779 A1 describes a method for joining two DVD substrates with a UV varnish by inserting one of the substrates in the cover section and the other substrate in the bottom section of a vacuum chamber and fixing them in a centered position, and by placing the cover section on the bottom section with the adhesive layers opposing one another. After the vacuum chamber is evacuated and the pressure has decreased below a predetermined pressure, a centering/clamping device disposed in the cover section is released and the upper substrate falls onto the lower substrate, whereby the falling motion is reinforced by several weights which are arranged in the cover section around the central hole of the substrate and provided with axial guide rods. Springs and the like can be provided instead of weights. When the two adhesive layers of the substrates are then positioned on top of each other with the adhesive layers still wet, the vacuum chamber is vented to air, whereby the atmospheric pressure causes those areas between the adhesive and the two substrates that have not yet made contact to be pressed against each other. This arrangement is not suitable for gluing substrates with an applied hot melt adhesive, because the weights and the atmospheric pressure cannot generate the pressing force required for precisely joining the substrates. In addition, the contact pressing force produced by the weights is not distributed uniformly across the entire substrate surface.

JP 1-204727 A suggests producing optical data carriers by coating two substrates with an adhesive of the hot-melt type and subsequently joining the two substrates in a vacuum chamber, whereby certain upper limit values for pressure, temperature and pressing force are preset. A wall in the vacuum chamber has openings for piston rods which can be used to press the pressure plates against each other, with the substrates placed between the pressure plates.

EP 0 735 530 A1 describes a system where the DVD substrates have initially an adhesive of the hot melt type (thermoplastic adhesive) spread across their surfaces. Subsequently, a UV-curable liquid adhesive is filled in a recess provided proximate to the central hole in one substrate. The substrate that has only hot melt adhesive applied, is then rotated by a handling system by 180°, so that the sides of the substrates having the applied adhesive face one another, and placed on the lower substrate. In this joined state, the two substrates and/or the DVD are placed onto a lower pressure plate which has in its center a quartz glass window for admitting UV radiation, and which also forms the bottom plate of a vacuum chamber. The cover section of the vacuum chamber is moved from the top position downwardly, until the edge of the cover contacts the bottom plate, thereby forming a chamber, which can be evacuated through a connection disposed in the bottom plate. The piston rod of a piston-cylinder unit passes through the cover. Another pressure plate is located on the lower end of the piston rod. When the pressure in the vacuum chamber drops below a predetermined pressure, the pressure is applied to the upper piston rod which moves the piston rod downwardly and presses the superpositioned substrates together between the upper pressure plate and the bottom plate. At the same time, UV light is introduced through the quartz glass window into the vacuum chamber to cure the UV adhesive. After a time that can be preset, the vacuum chamber is vented to air, the piston is moved downwardly and the UV irradiation is tuned off. This concludes the process step of joining the substrates and the completed DVD can be removed.

These conventional systems for joining DVD substrates have the disadvantage that the vacuum chamber, on one hand, and the pressing device, on the other hand, are implemented as separate units and are operated independent of each other. As a result, the pressure plates which press the substrates against each other are always restrictively guided, so that a small tilt in the position of the substrates cannot be easily compensated. When such small tilt in the position of the substrate occurs, a very high pressing force is applied at one location and a rather lower pressing force is applied at another location. This impairs the parallel alignment of the DVD.

The German utility model DE 299 04 325 U1 describes a device for joining DVD substrates by applying a vacuum. This reference provides a collapsible chamber, whereby one substrate is inserted in the cover section and the other substrate in the bottom section of the vacuum chamber. The substrate holder which is located in the bottom portion is movably supported. In addition, a lifting plate is provided, from which several guide shafts extend upwardly through the bottom portion of the vacuum chamber. The guide shafts are operatively connected with the lower substrate holder so as to enable an additional mechanical displacement of the lower substrate holder for increasing the pressing force. When a low-pressure is applied between the substrates, in a first step, the lower moveable substrate holder moves upwardly and the substrates are glued together with a first value of the pressing force. In a second step, the lifting plate is moved upwardly and mechanically displaces via the a guide shafts the lower substrate holder, thereby increasing the pressing force to a second value. However, the guide shafts have to be disadvantageously guided vacuum-tight through the bottom portion of the vacuum chamber, which requires complex sealing measures. Moreover, at least the lifting plate and the guide shafts must disadvantageously be moved downwardly by the joining vacuum due to the mechanical connection with the lower substrate holder.

Consequently, the drive means for the lifting plate have to be mechanically decoupled from this lifting plate, or the drive means has to also be moved downwardly by the joining vacuum. This system also restrictedly guides the substrates due to the guide shafts and the lifting plate. This device therefore has the same disadvantages as the conventional devices described above.

It is desirable to provide a device for vacuum pressing of DVD substrates, which allows for relative alignment of the substrates to be glued. The device should preferably have a relatively simple construction and the pressing force employed for joining and pressing the DVD substrates should preferably be continuously adjustable across a wide range.

SUMMARY OF THE INVENTION

According to one aspect of the invention, a device for vacuum-pressing of disk-shaped substrates, in particular of DVD substrates, includes a vacuum chamber; a first substrate holder for a first substrate housed in the vacuum chamber and formed as an intermediate element dividing the vacuum chamber into a first low-pressure chamber and a second overpressure chamber. The intermediate element can be displaced in the vacuum chamber and is equipped with a peripheral seal. The device further includes a second substrate holder for a second substrate housed in the vacuum chamber. The intermediate element, on a side facing the low-pressure chamber, is formed as a first substrate support for-the first substrate. The second substrate holder has a second substrate support for the second substrate that is disposed in the vacuum chamber opposite the first substrate support.

The process flow during vacuum pressing can thereby be optimized by controllably adjusting, on one hand, the low-pressure and, on the other hand, the overpressure, whereby the intermediate element is pulled in when the vacuum is applied, causing a decrease in volume of the low-pressure chamber, which pulls the substrates against each other. The process flow can be further optimized by building up additional pressure in the overpressure chamber at an appropriate time, whereby the intermediate element and thereby also one of the substrates are pressed sufficiently strongly against the other substrate. Since the intermediate element is supported only by the seal(s) and is therefore floating to some extent, the intermediate element can perform a small tilting motion, allowing the substrate holder of the intermediate element to conform within certain limits to the position of the other substrate. It should be noted that the molded substrates do not have exactly the same thickness across their surface area, so that regions are formed that are subjected to a high pressing force, where the other regions are subjected to a lower pressing force.

According to another aspect of the invention, a device for vacuum-pressing of disk-shaped substrates, in particular of DVD substrates, includes a vacuum chamber and a first substrate holder for a first substrate housed in the vacuum chamber and formed as an intermediate element dividing the vacuum chamber into a first low-pressure chamber connected to a vacuum pump and a second chamber that can be alternatingly connected to the vacuum pump and a compressed gas source. The intermediate element can be displaced in the vacuum chamber and is equipped with a peripheral seal. A second substrate holder for a second substrate is also housed in the vacuum chamber. The intermediate element on a side facing the first chamber is formed as a first substrate support for the first substrate. The second substrate holder has a second substrate support for the second substrate disposed in the vacuum chamber opposite the first substrate support.

By connecting the lower chamber selectively and alternatingly to a compressed air source and a vacuum pump, a vacuum can be produced on both sides of the intermediate element. When the same vacuum pressure is applied on both sides, then there is a force equilibrium and the intermediate element initially remains in its initial position. When a certain value of the low-pressure is reached, the pressure in the lower chamber is raised to ambient pressure, which causes the intermediate element to move upwardly and the substrates to contact each other. Subsequently, the system is switched over to an overpressure to enable a reliable pressing operation. The joining speed of the process can be optimized by adjusting the rate at which the pressure in the lower chamber is raised. Depending on the joining speed, the joining process can be adjusted to be rather hard or rather soft, which is important for brittle or sensitive layers, such as DVD 18, DVD-R and DVD-RW.

Advantageous embodiments of the invention may include one or more of the following features. The device can include pressure generating means for generating a pressure on at least one of the first and second substrate holders, such as a vacuum pump and a compressed gas source. The intermediate element can be formed as a piston having at least two spaced annular grooves, with the peripheral seal having at least two spaced apart sealing rings inserted in the corresponding annular grooves.

The intermediate element further can be made of several sections, wherein at least two sections are provided with a peripheral seal. The seal can include one or more sealing lips. The section forming a boundary between the first low-pressure chamber and the second chamber is formed as the first substrate holder. Several rods can be disposed between the sections.

The intermediate element can further include circumferentially arranged sliding or roller bearings, enabling the intermediate element to move in the vacuum chamber. The first low-pressure chamber can include a cover section being secured on the vacuum chamber by a hinge, to enable opening and closing the cover section. The cover section may further include an axially displaceable centering pin, for centering the second substrate, wherein the centering pin can be inserted through the second substrate into a center hole provided in the first substrate when the first substrate is positioned on the first substrate holder.

Advantageously, at least one of the substrate holders can be implemented as a vacuum plate which can include vacuum channels for holding the substrates by vacuum-suction. The vacuum channels can be operated separately of each other. The cross sectional area of the vacuum channels disposed near the center of the substrate holders is greater than the cross sectional area of the vacuum channels near the peripheral region of the substrate holders. The vacuum channels can also be connected to a compressed gas source, wherein the compressed gas can blow at least one of the substrates off a corresponding substrate holder from a center of the substrate towards the periphery of the substrate. The vacuum channels located near the center of the substrate holders can be operated separately from the vacuum channels located near the periphery of the substrate holder. An O-ring can surround either substrate for providing a seal.

The vacuum chamber, in particular the second chamber, can have either separate connections or a single connection from which a connecting line branches off, for alternatingly connecting the second chamber to the vacuum pump and the compressed gas source.

Further features and advantages of the present invention will be apparent from the following description of preferred embodiments and from the claims.

BRIEF DESCRIPTION OF THE DRAWING

The following figures depict certain illustrative embodiments of the invention in which like reference numerals refer to like elements. These depicted embodiments are to be understood as illustrative of the invention and not as limiting in any way.

FIG. 1(a)–FIG. 1(m) show schematically an exemplary device for vacuum pressing of substrates at various stages of the process;

DETAILED DESCRIPTION OF PREFERRED EMBODIMENTS

The invention is directed to a device for vacuum-pressing of substrates, in particular DVD substrates.

Figure 1:
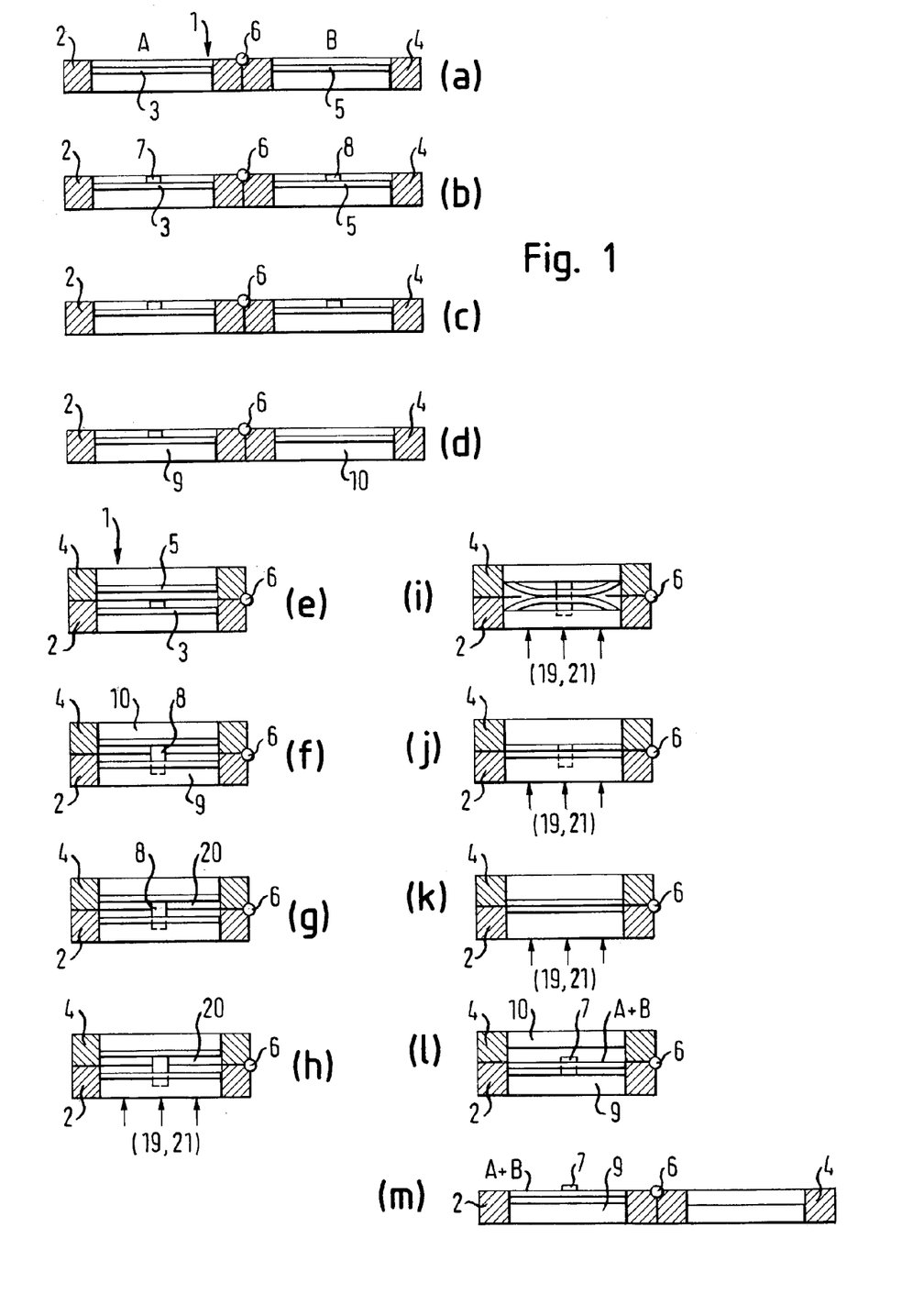

Referring first to FIG. 1, a vacuum chamber 1 includes a bottom section 2 for receiving a first (A) substrate 3 and a cover section 4 for receiving a second (B) substrate 5. The vacuum chamber can be closed by rotating the cover section 4 about an axis 6 that is perpendicular to the plane of the drawing sheet First, the DVD substrates 3 and 5, to which an adhesive has been applied, are inserted in the cover section and the bottom section (FIG. 1a), with the surface having the adhesive pointing upwardly. The substrates are positioned in the bottom section and the cover section on vacuum plates and are fixed in their position by the vacuum (holding vacuum). In the next step of the process (FIG. 1b), the holding vacuum on the A-substrate 3 and the holding vacuum on the B-substrate 5 are switched off, the centering pins 7 and 8 are extended so as to pass through the corresponding center hole of the substrates. Thereafter, the holding vacuum on the B-substrate 5 is turned on again (FIG. 1c), the B-centering pin 8 is retracted (FIG. 1d), the cover section 4 is rotated about the axis 6 and the vacuum chamber 1 is closed (FIG. 1e). To prevent the substrates from being pulled against each other due to electrostatic charges, the holding vacuum on the A-substrate 3 is turned on again when the vacuum chamber is closed. After the vacuum chamber is closed, the B-centering pin 8 is extended, passing through the center opening of the A-substrate 3, whereby the A-centering pin 7 is simultaneously pushed back (FIG. 1f). Both DVD substrates A and B are now centered together on the B-centering pin B. The joining vacuum is now applied, i.e., the vacuum chamber 1 is evacuated with the vacuum pump, causing the joining plate A, i.e., substrate holder 9, to be pulled upwardly by the vacuum (FIG. 1g). To provide support, compressed air is applied to the substrate holder 9 from below (FIG. 1h). When the lower substrate holder 9 with the A-substrate 3 has come within a certain distance of the B-substrate 5, the holding vacuum is switched off on both substrates A and B, and air is admitted to the substrates A and B through the vacuum channels in the substrate holders. Both substrates A and B are then blown off the substrate holders (FIG. 1i), which will be described in more detail below with reference to FIG. 2. Since neither substrate A and B is connected to the vacuum plates shortly before contact between the adhesive surfaces is established, the substrates can once more be precisely centered via the common centering pin. When the substrates are blown off, they are bent in the middle from the inside to the outside (see also FIG. 2), so that the adhesive surfaces establish contact from the inside towards the outside, whereby the joining vacuum between the substrates A and B also removes the residual air between the substrates. The substrates A and B are now joined; the substrate holder 9 (see FIG. 3) which is formed as a piston reaches a stop, and the desired pressure (FIG. 1j) can build up under the piston. When the pressing force has been applied for a sufficiently long time, the B-centering pin 8 is retracted, the holding vacuum A is switched on and the joining vacuum is switched off (FIG. 1k). As soon as the pressure is switched off, the piston can retract, the blow-off at B is switched on and the A-centering pin is extended (FIG. 1l). Finally, the cover section 4 is rotated in the open position and the holding vacuum A is switched off. The completed DVD is centered on the substrate holder 9 (the plate A) and can now be removed.

Figure 2:
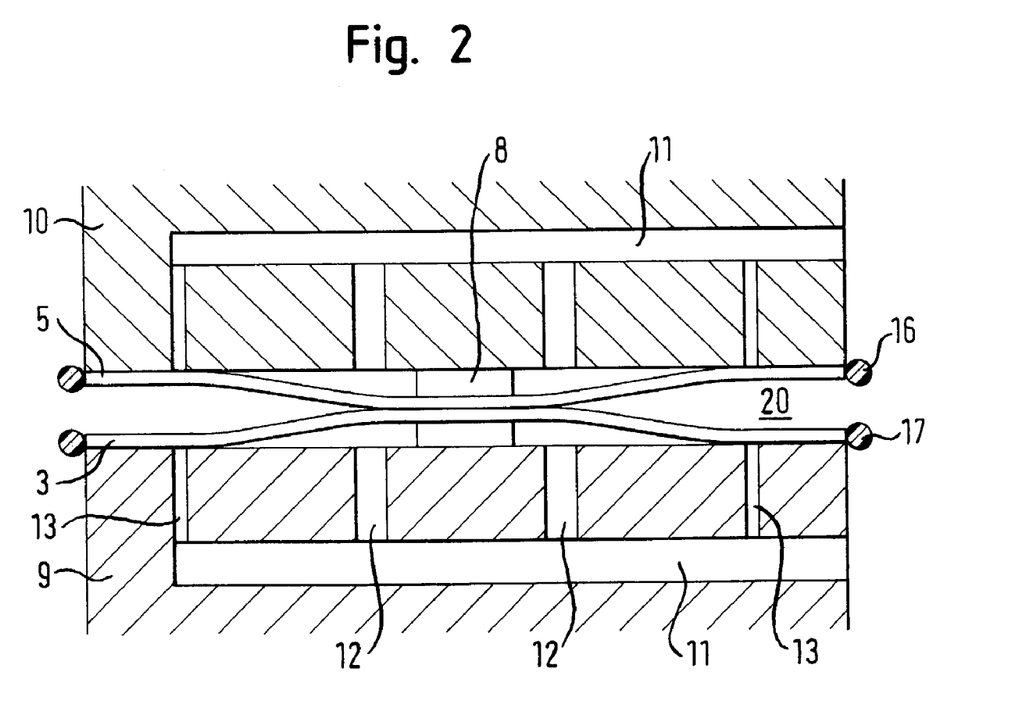
FIG. 2 is an enlarged view of the device for vacuum pressing of substrates at the process stage depicted in FIG. 1 (i)
Figure 5:
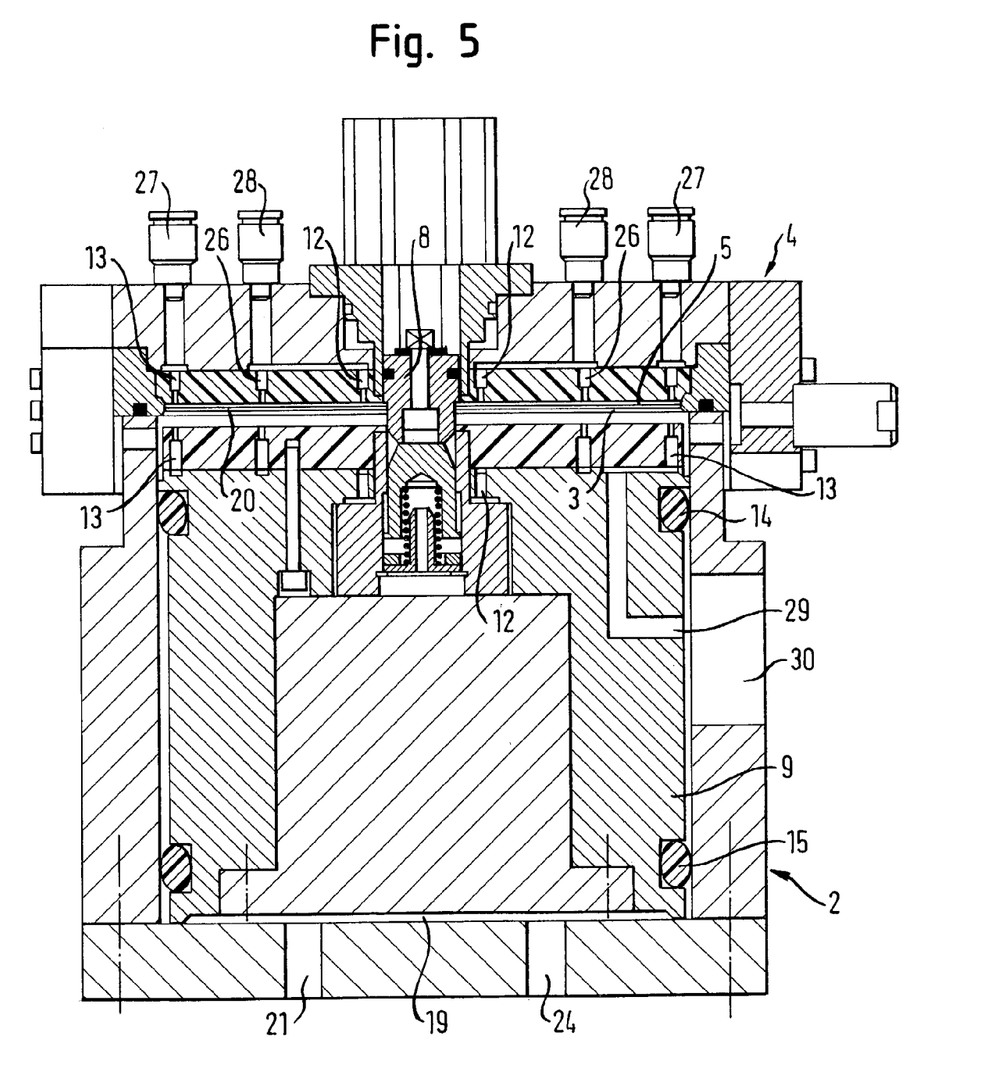
FIG. 5 is a second embodiment of the exemplary device for vacuum pressing in an open position.

FIG. 2 is an enlarged view of the process step 1i. Vacuum channels 11 to 13 are disposed in both substrate holders 9 and 10, with the main channels 11 which are each connected to a vacuum pump extending horizontally in the substrate holders 9 and 10. Channels 12 branch off the main channels 11 proximate to the center hole, whereas channels 13 branch off the main channels 11 in the peripheral region and terminate in the surface of the substrate holders. The channels 12 have a larger diameter that the channels 13. This system of channels helps form the holding vacuum in the process steps depicted in FIG. 1. By switching from vacuum to blow-off, air is also admitted via this channels system in the process step depicted in FIG. 1i for blowing off the substrates A and B in the center. The substrates are centered by the B-centering pin 8, which passes through both center holes. The lower substrate holder 9 has a sufficiently large opening for the B-centering pin 8. By blowing off the substrates A and B, the substrates are released from the surface of the substrate holders and can be centered exactly once more before the adhesive-coated surfaces make contact with each other. The substrates are preferably released and blown off first on the inside due to the larger vacuum bore 12 on the inside. Releasing and blowing off the substrate from the inside outside significantly reduces the risk of air inclusions between the substrates A and B. Alternatively, the inner and outer channels 12 and 13, respectively, can be separated, as shown in the example of FIG. 5, so that the vacuum on the outside can be switched off with a delay by a separate valve and can be switched over with a delay for blowing off the substrates. When the vacuum channels 12 and 13 are operated separately (see FIG. 5), then the vacuum channels 12 and 13 can have the same diameter. Holdings the substrates at the marginal regions can be supported by using upper and lower O-rings. By separately forming and controlling the vacuum channels in the upper substrate holder 10 and in the lower substrate holder 9, different blow-off pressures P1 and P2 can be set, whereby a different dishing can be defined to counteract or compensate for existing dishing effects.

Figure 3:
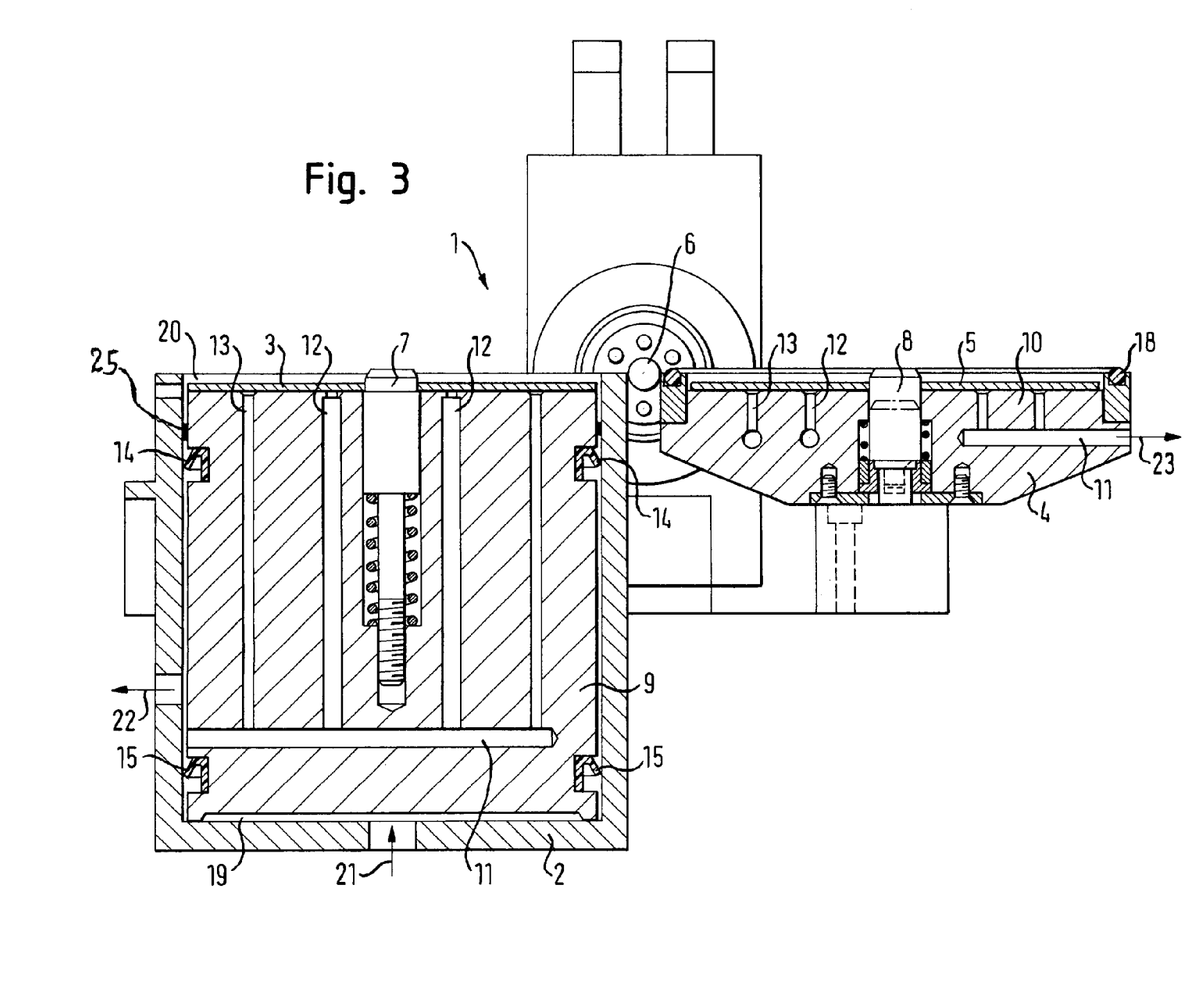
FIG. 3 is a first embodiment of the exemplary device for vacuum pressing in an open position.

FIG 3 shows the vacuum chamber 1 in an open position, with substrates A and B (reference numerals 3 and 5)

inserted in the bottom section 2 and the cover section 4, as well as with the centering pins 7 and 8. Also seen in the bottom section and the cover section are the vacuum channels 11, 12 and 13 for the holding vacuum and the blow-off feature. It can also be seen that the lower substrate holder 9 is formed as a piston, which is floatingly, but sealingly, supported by an upper sealing lip 14 and a lower sealing lip 15 for displacement in the bottom section 2. The guide means 25 can be provided in the region of the upper sealing lip. Otherwise, the piston 9 is spaced apart from the interior wall of bottom section. In this way, the floating piston 9 can optimally adapt to the stationary cover. When the vacuum chamber is closed and sealed with a sealing ring 15, a two-chamber system is formed whereby above the piston 9 a low-pressure chamber 20 is formed having a forming vacuum and below the piston 9 an overpressure chamber 19 is formed which is operatively connected with a compressed air source 21 (not shown). The lower substrate holder 9 is drawn in by the forming vacuum in the low-pressure chamber 20 and auctioned against the upper substrate holder 10. In the process steps depicted in FIGS. 1h to k, air is introduced into the overpressure chamber 19 and the tower substrate holder 9 is moved upwards by this compressed air. A mechanical misalignment during the pressing operation is eliminated by guiding the piston 9 only in its upper range and otherwise connecting the piston 9 with the interior wall only by the sealing lips 14 and 15. When the lower substrate holder or piston 9 reaches a stop, the required pressure can be applied to the piston 9 via the overpressure chamber 19, so as to complete the Joining process with a pressing step.

Figure 4:
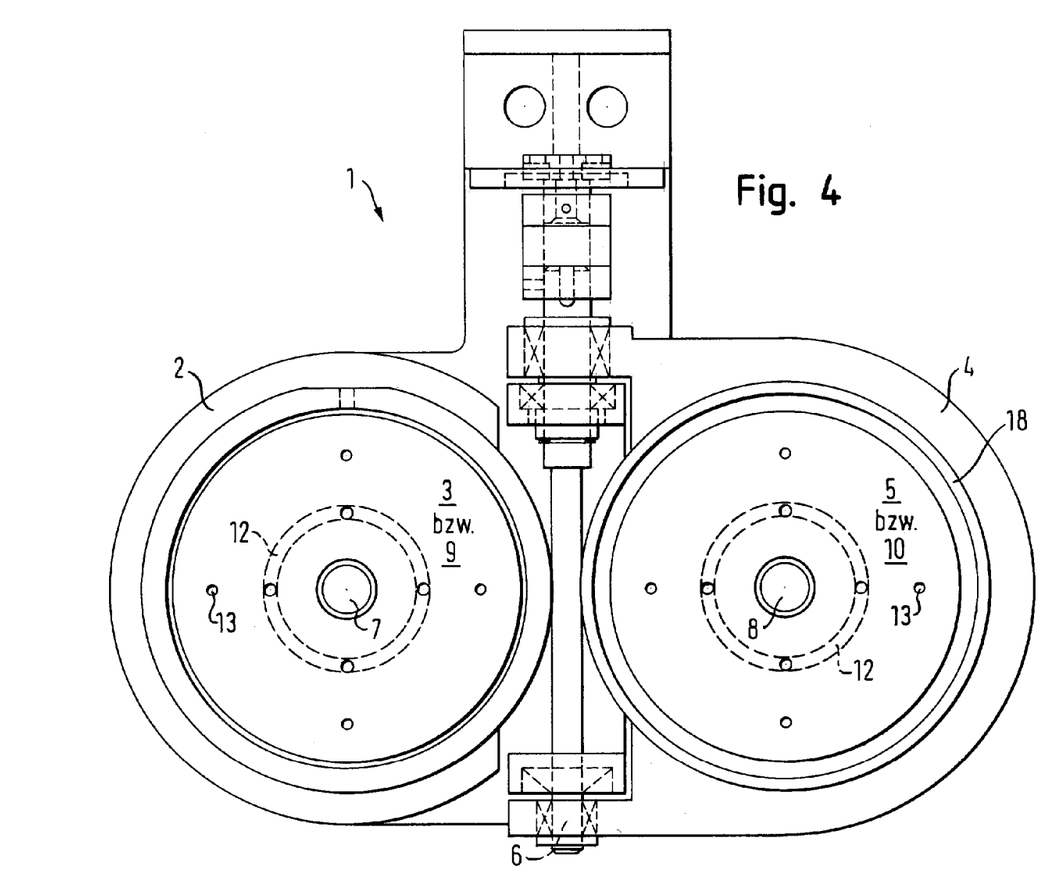
FIG. 4 is a top view of the device of FIG. 3.

FIG. 4 shows a top view of the vacuum chamber 1 in an open position. Identical reference numerals describe identical elements.

Since the adhesive of the hot melt type is free of solvents and melts and becomes tacky at high temperatures, the substrate holder 9 and/or 10 as well as the cover section and/or the bottom section of the vacuum chamber can be heated to shorten the time between the joining operation and the cooling step.

In the second embodiment of the joining station according to the invention illustrated in FIG. 5, the lower chamber 19 is connected to both a compressed air source 21 and a vacuum pump 24 and can alternatingly be filled with compressed air or evacuated. For reducing the amount of air entrained between the substrates as much as possible before joining, a high vacuum is required in the joining space 20 between the substrates. A high joining vacuum reduces air inclusions between the adhesive-covered surfaces of the substrates. This improves the quality of the glued surface as well at the adhesion, which results in an improved stability and flatness of the bonded disk. For achieving a high joining vacuum of approximately 50 mbar and below, the lower chamber 19 is initially also connected to a vacuum pump 24 and also evacuated. In other words, an identical vacuum pressure is applied to both sides of the piston 9. The low-pressure chamber 20 (=joining vacuum chamber) and the lower chamber 19 have the same diameter. Accordingly, the forces are balanced and the piston 9 initially remains in its initial position. When the desired vacuum is reached on both sides of the piston 9, the pressure in the lower chamber 19 is raised to ambient pressure, allowing the piston to move upwardly due to the pressure difference. Subsequently, the system is switched over to the compressed air source 21 and the substrates are pressed together as shown in the example of FIG. 3. The joining speed, i.e., the speed at which the piston 9 moves upwardly, can be optimized for the process by adjusting the speed at which the pressure is raised from vacuum to ambient pressure. The joining process can be adjusted to be rather hard or rather soft by adjusting the joining speed, which is important for brittle or delicate layers, such as DVD 18, DVD-R, and in DVD-RW. In all other aspects, the construction and the functionality are identical to those of the embodiment of FIG. 3. Identical reference numerals describe identical elements.

To facilitate joining of the two substrates from the inside to the outside, the upper substrate 5 is initially slightly curved with the help of the upper centering pin 8, which has for this purpose a suitable shoulder. Then the vacuum on the inner vacuum channels 12 is switched off. Thereafter, the vacuum on the outer vacuum channels 13 is switched off. Optionally, additional channels 26 can be provided in the center region of the substrate, which can preferably be connected with the inner vacuum connection. A soft support for the substrates, for example PAI, facilitates joining from the inside to the outside. After the inner vacuum is switched off, the system can optionally be switched over to blow-off.

Positioning and orientation of the substrates A and B relative to one another can be improved by mechanically interlocking the cover section 4 with the bottom section 2 after the joining station is closed.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed as new and desired to be protected by Letters Patent is set forth in the appended claims and their equivalents:

1. Device for vacuum-pressing of disk-shaped substrates, in particular of DVD substrates, comprising:
  a vacuum chamber;
  a first substrate holder for a first substrate housed in the vacuum chamber and formed as an intermediate element dividing the vacuum chamber into a first chamber connected to a vacuum pump and a second chamber directly connected to a compressed gas source, for feeding said compressed gas into said second chamber said intermediate element displaceable in the vacuum chamber and being equipped with a peripheral seal; and
  a second substrate holder for a second substrate housed in the vacuum chamber, wherein the intermediate element on a side facing the first chamber is formed as a first substrate support for the first substrate, and wherein the second substrate holder has a second substrate support for the second substrate disposed in the vacuum chamber opposite the first substrate support.

2. Device according to claim 1, wherein the vacuum pump and the compressed gas source are part of a pressure generating means for generating a pressure on at least one of the first and second substrate holders.

3. Device according to claim 1, wherein the intermediate element is formed as a piston having at least two spaced annular grooves and the peripheral seal comprises at least two spaced apart sealing rings inserted in the corresponding annular grooves.

4. Device according to claim 1, wherein the intermediate element includes a plurality of sections, wherein at least two sections are provided with a peripheral seal, with one of the sections bounding the first chamber and forming the first substrate holder; and further comprising a plurality of rods disposed between the plurality of sections.

5. Device according to claim 1, wherein the intermediate element includes circumferentially arranged sliding or roller bearings enabling displacement of the intermediate element in the vacuum chamber.

6. Device according to claim 1, wherein the seal further includes at least one sealing lip.

7. Device according to claim 1, wherein at least one of the first and second substrate holders is implemented as a vacuum plate.

8. Device according to claim 1, wherein the first chamber includes a cover section being hingedly secured an the vacuum chamber to enable opening and closing the cover section.

9. Device according to claim 8, wherein the cover section includes an axially displaceable centering pin for centering the second substrate, with the centering pin being insertable through the second substrate into a center hole provided in the first substrate when the first substrate is disposed on the first substrate holder.

10. Device according to claim 1, wherein at least one of the first and second substrate holders includes vacuum channels for holding the first and second substrates by vacuum-suction.

11. Device according to claim 10, wherein the vacuum channels disposed in the first substrate holder and the second substrate holder can be operated separately from each other.

12. Device according to claim 10, wherein at least one of the first and second substrates includes an O-ring surrounding the substrate.

13. Device according to claim 10, wherein the vacuum channels disposed near a center of the at least one of the first and second substrate holders can be operated separately from the vacuum channels disposed near a periphery of the substrate holder.

14. Device according to claim 10, wherein the vacuum channels can be connected to a compressed gas source, with a compressed gas being blown through the vacuum channels when the vacuum-suction is switched off.

15. Device according to claims 14, wherein the compressed gas blows at least one of the first and second substrates off a corresponding substrate holder from a center of the substrate towards the periphery of the substrate.

\* \* \* \* \*

UNITED STATES PATENT AND TRADEMARK OFFICE
CERTIFICATE OF CORRECTION

PATENT NO. : 6,971,428 B2 Page 1 of 1
DATED : December 6, 2005
INVENTOR(S) : Martin Eichlseder It is certified that error appears in the above-identified patent and that said Letters Patent is hereby corrected as shown below:

<u>Column 9,</u>
Line 11, change "an" to -- on --.

Signed and Sealed this

Sixteenth Day of May, 2006

JON W. DUDAS
*Director of the United States Patent and Trademark Office*